United States Patent [19]

Sonoda et al.

[11] Patent Number: 4,967,996
[45] Date of Patent: Nov. 6, 1990

[54] PILOT TYPE CONTROLLED ELECTROMAGNETIC VALVE SYSTEM

[75] Inventors: Yoshiteru Sonoda; Atsuo Tomita; Eiji Ideta; Koji Nishino; Koichi Tsubomoto, all of Osaka, Japan

[73] Assignee: Masako Kiyohara, Kumamoto, Japan

[21] Appl. No.: 367,803

[22] Filed: Jun. 19, 1989

[30] Foreign Application Priority Data

Jun. 28, 1988 [JP] Japan .................................. 63-160552

[51] Int. Cl.$^5$ ............................................. F16K 31/12
[52] U.S. Cl. .................... 251/30.02; 251/45; 251/129.15
[58] Field of Search ................... 251/30.02, 45, 129.15

[56] References Cited

U.S. PATENT DOCUMENTS

| 3,372,899 | 3/1968 | McPherson | 251/30.02 |
| 3,379,406 | 4/1968 | Greer | 251/45 |
| 3,439,895 | 4/1969 | Marandi | 251/30.02 |
| 4,099,701 | 11/1978 | Berger | 251/45 |
| 4,256,133 | 3/1981 | Coward et al. | 137/78.3 |
| 4,679,766 | 7/1987 | Cuming | 251/129.15 |

FOREIGN PATENT DOCUMENTS 2139322 11/1984 United Kingdom ............ 251/30.02

Primary Examiner—A. Michael Chambers
Attorney, Agent, or Firm—Griffin Branigan & Butler

[57] ABSTRACT

The pilot type controlled electromagnetic valve system in accordance with the present invention is opened and closed principally by means of automatic remote control.

The controlled valve system comprises a main valve F; a pilot valve G for opening and closing the main valve F by means of the fluid pressure on the primary side; a latching solenoid H for opening and closing the pilot valve G; and a solenoid drive control unit I for driving the solenoid H by supplying a discharge current from a capacitor to the solenoid. A pulse discharge current is supplied to the solenoid H from the capacitor C only when the pilot valve G is opened or closed, and no excitation current is supplied continuously through the coil of the solenoid. As a result, the power source battery can be reduced in size, and therefore virtually no accidents take place in the controlled valve system due to no heat generation in the coil.

5 Claims, 4 Drawing Sheets

PILOT TYPE CONTROLLED ELECTROMAGNETIC VALVE SYSTEM

BACKGROUND OF THE INVENTION

The present invention relates to a compactly-designed and energy-saving pilot type controlled electromagnetic valve system for use mainly in controlling water supply.

In recent years, a so-called automatic meter check system utilizing a microprocessor-controlled water meter has been under development for the water supply systems in large cities. FIG. 3 shows the construction of a typical automatic meter check system. In FIG. 3, the meter check center A of the water supply side and the intensive meter check control unit B of the user side telecommunicate via a telephone line C to remotely and intensively control the reading of the water meter D of each user, as well as the opening and closing operations of the water supply controlled valve system E via the intensive meter check control unit B.

Such a water supply controlled valve system E usually takes the form of a pilot type controlled electromagnetic valve system as shown in FIG. 4. In FIG. 4, when the coil 1 of a solenoid is excited through remote control to attact a plunger 2 for separating a valve disk 3 from its valve seat 4, the water pressure inside the bonnet chamber 5 of the main valve F is released successively through a fluid path 6, a pilot valve chamber 7, and a fluid path 8 toward a secondary fluid path 9. Consequently, a diaphragm 11a is pressed upward by the primary fluid pressure $P_1$ to push the valve disk 11 upward against the force of a spring 10. With the above operation, the primary fluid path 12 is communicated with the secondary fluid path 9 to consequently open the main valve F.

When the excitation of the coil 1 is interrupted, the pilot valve 3 moves downward to close the fluid path 8. With this operation, the fluid in the primary path is conducted into the bonnet chamber 5 of the main valve F successively through a primary pressure path 13, the pilot valve chamber 7, and the fluid path 6, by which the internal pressure of the bonnet chamber 5 is increased by the primary fluid pressure to press the valve disk 11 downward and consequently close the main valve F.

However, in a controlled electromagnetic valve system having the above construction, it is necessary to continuously supply a large current to excite the solenoid coil during the opening or closing operations of the main valve F. Therefore, a power source having a large capacity is necessary in order to cope with the large power consumption, which also incurs the problems of heat generation, etc.

Furthermore, for the integration of a driving power inside the controlled valve system, it is difficult to reduce the size of the valve, due the necessity of having a large-sized power source for the above reasons, which also results in a significant increase in the size of the water supply controlled valve system.

The present invention provides a novel controlled electromagnetic valve system for water supply permitting size reduction as well as power or energy savings, by eliminating the above-mentioned problems accompanying any conventionally controlled electromagnetic valve system for water supply, with the problems being: (1) the necessity of a large power capacity for the opening or closing operations of the valve system, leading to an increase in size of the driving power unit; (2) the difficulty in reducing the size of the valve system for structural reasons, etc.

SUMMARY OF THE INVENTION

Generally, the valve in an electromagnetic valve system of the above type is not frequently subjected to opening or closing operations for water supply, but held in an opened or closed condition for a long time. Therefore, the valve is not required to have a rapid operation speed in the opening or closing operations.

The controlled valve system in accordance with the present invention has been developed in view of the above characteristics of the valve system during use. In detail, by employing a latching type solenoid and charging a capacitor for a certain period to perform valve opening and closing operations using a discharge current of the capacitor; the dimensional reduction of the entire system, the minimization of power capacity, and energy savings are obviated.

An object of the present invention is to provide a pilot type controlled electromagnetic valve system comprising a main valve; a pilot valve for selectively controlling a fluid flow path extending from the main valve through the pilot valve to thereby control operation of the main valve, the pilot valve comprising, a plunger means movable between a first position whereat it blocks the fluid flow path and a second position whereat it does not block the fluid flow path, a spring for biasing the plunger toward the first position, a permanent magnet for generating a flux retaining the plunger at the second position, and coil means for selectively generating magnetic fields to move the plunger from one of the positions to the other; and, a drive control circuit for applying a first or a second excitation current pulse to the coil means, the coil means being responsive to the first excitation current pulse for moving the plunger from the first to the second position against the bias of the spring means, and responsive to the second excitation current pulse for generating a flux offsetting the retaining flux of the permanent magnet whereby the plunger is moved to said first position by the spring.

The drive control circuit comprises first and second capacitors; a battery; switch means connected to the battery and the first and second capacitors, the switch means including means responsive to a first signal for connecting the battery to the first capacitor to charge the first capacitor and means responsive to a second signal for connecting the battery to the second capacitor to charge the second capacitor, and first and second gating devices, the first gating device being connected to the first capacitor and the coil means for gating the charge on the first capacitor into the coil means as the first excitation current pulse, the second gating device being connected to the second capacitor and the coil means for gating the charge on the second capacitor into the coil means as the second excitation current pulse.

Other objects of the invention and its mode of operation will become apparent upon consideration of the following description and the accompanying drawings.

BRIEF DESCRIPTION OF THE DRAWINGS

FIG. 3 is a vertically sectioned view of a conventional pilot electromagnetic valve system.

DETAILED DESCRIPTION OF THE INVENTION

Figure 1:
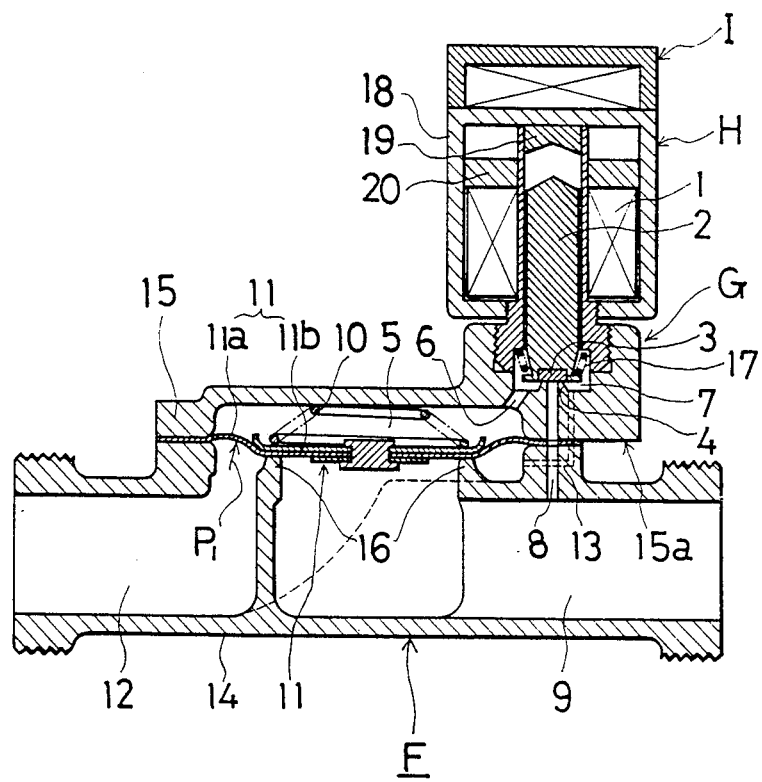
FIG. 1 is a vertical section view of a controlled electromagnetic valve system in accordance with the present invention.
Figure 2:
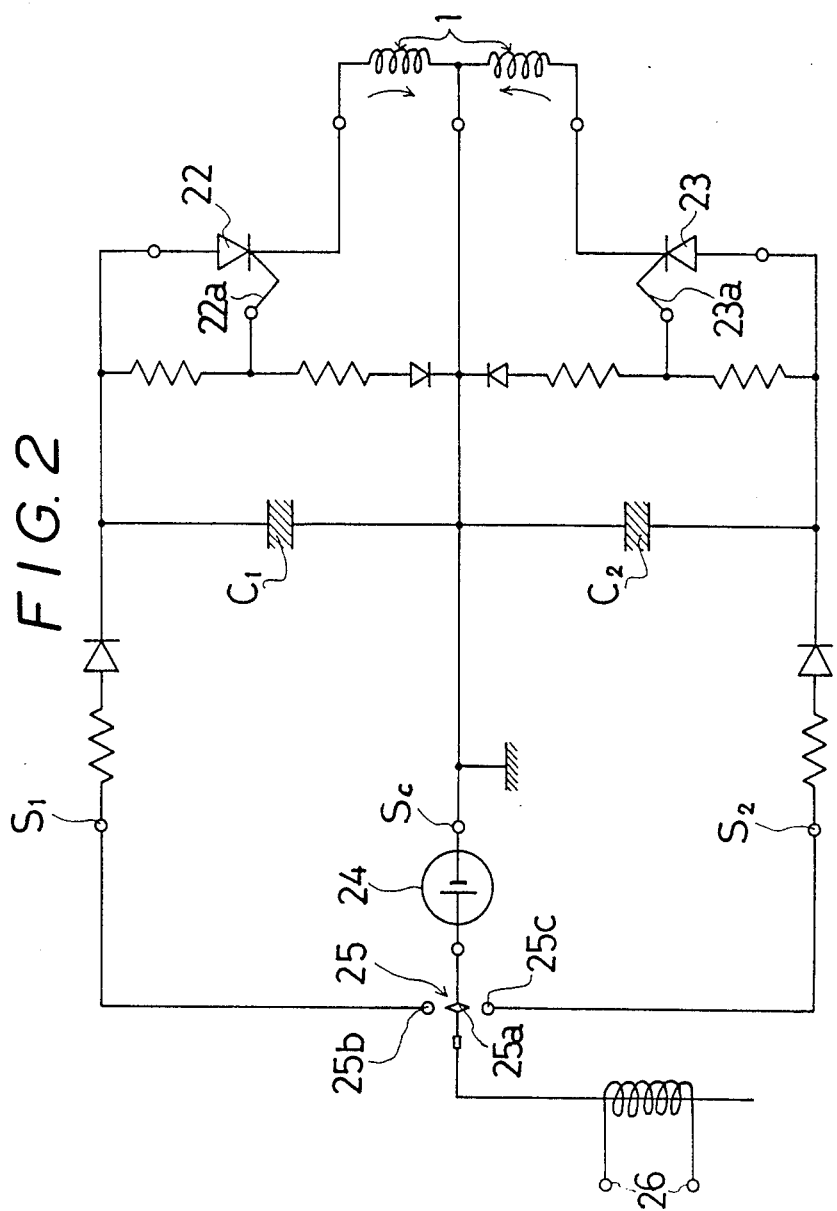
FIG. 2 is the circuit diagram of a solenoid drive control unit.
Figure 3:
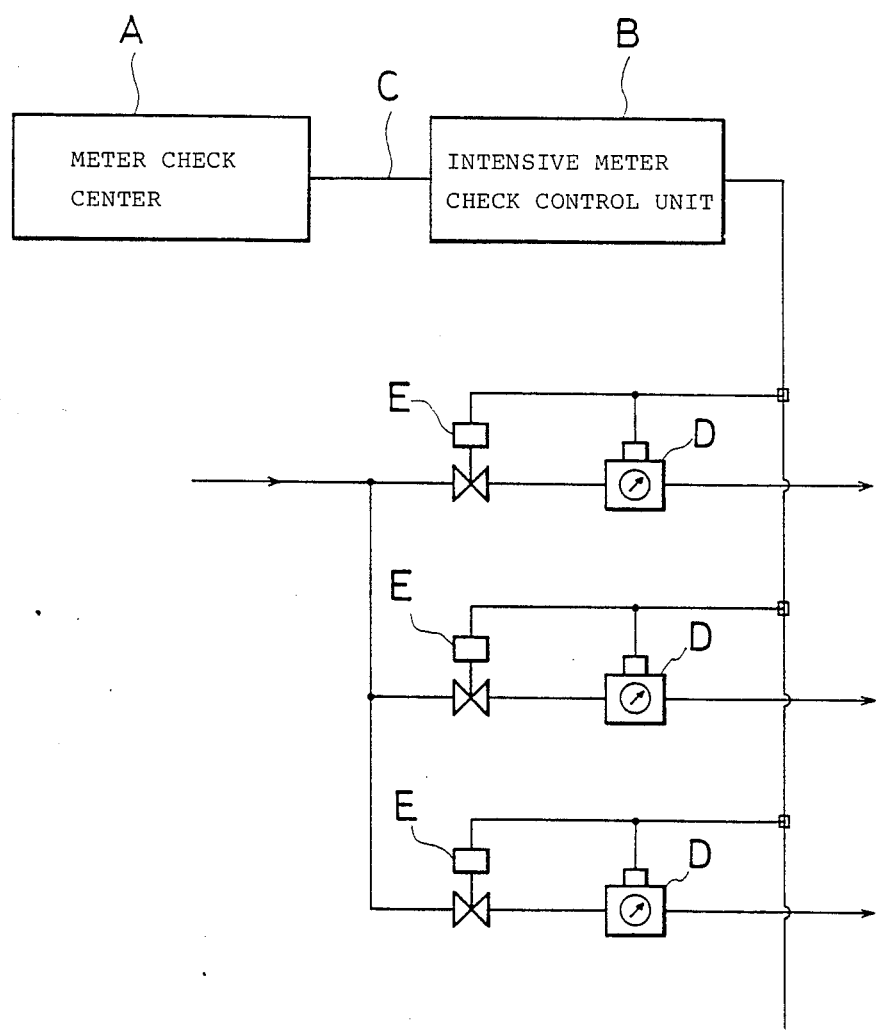
FIG. 3 is a block diagram of a water supply automatic meter check system to which the pilot type controlled electromagnetic valve system of the present invention is applied.
Figure 4:
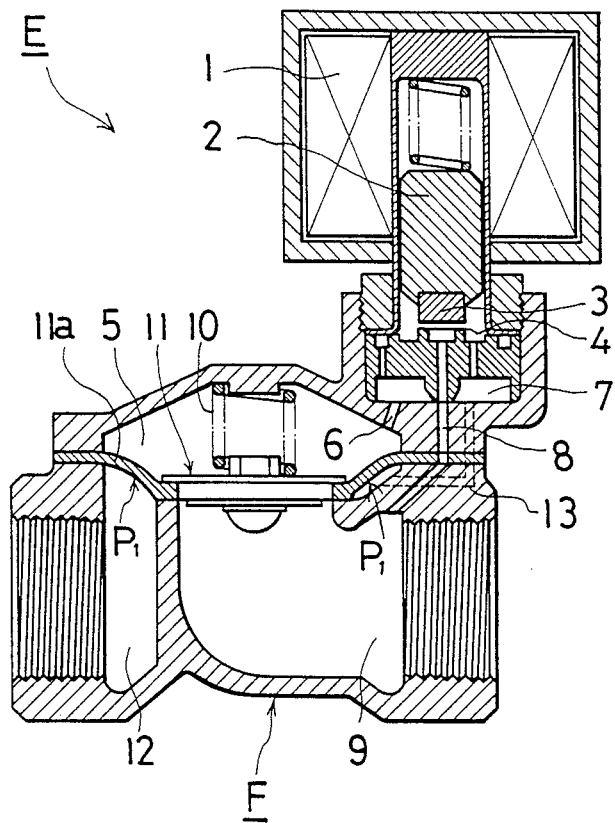

The following describes an embodiment in accordance with the present invention based on FIGS. 1 and 2. Note that in, in FIGS. 1 and 2, the parts equivalent to those in FIG. 4 are denoted with the same reference numbers.

FIG. 1 is a vertically sectioned view of a controlled electromagnetic valve system in accordance with the present invention. The controlled electromagnetic valve system is composed of a main valve F, a pilot valve G, a latching solenoid H, and a solenoid drive control unit I.

The main valve F is composed of a valve housing 14, a bonnet 15 provided with an integrated pilot valve G, and a valve disk 11. The valve housing 14 includes a primary fluid path 12, a diaphragm valve seat 16, and a secondary fluid path 9. The valve disk 11 is composed of a diaphragm 11a and a disk plate 11b. The valve disk 11 is disposed between the bonnet 15 and the valve housing 14 with interposition of a spring 10 to be mounted on the diaphragm seat 16, which can be separable and accessible with respect to the diaphragm seat.

The pilot valve G is formed integratedly with the bonnet 15, and composed of a valve housing 15a formed with a pilot valve chamber 7 and a valve seat 4 as well as a disk 3. The valve chamber 7 is communicated with a bonnet chamber 5 via a fluid path 6, communicated with the primary fluid path 12 via a fluid path 13, and communicated with the secondary fluid path 9 via a fluid path 8. By opening and closing the fluid path 8 with the upward and downward movements of the disk 3, the valve disk 11 of the main valve F is moved upward and downward to open and close the main valve F.

In more detail, a plunger 2 of a solenoid H (described in detail hereinafter) protrudes downward to make the valve disk 3 abut against the valve seat 4 by the force of a spring 17 and consequently closes the fluid path 8. With this operation, the water pressure on the primary side is exerted inward toward the bonnet chamber 5 successively via the fluid path 13, the valve chamber 7, and the fluid path 6. Consequently, the diaphragm valve disk 11 abuts against the valve seat by the pressure of the spring 10 to close the valve. Conversely, when the plunger 2 is attracted upward against the force of the spring 17 to open the fluid path 8, the water pressure inside the bonnet chamber 5 decreases. Consequently, the diaphragm disk 11 is pressed upward by the water pressure $P_1$ on the primary side to open the main valve F.

The monostable latching solenoid H is composed of an excitation coil 1, a plunger 2, a spring 17, a yoke 18, an iron core 19, a permanent magnet 20, etc. The tip portion of the plunger 2 is connected to the disk 3 of the pilot valve G.

In the monostable latching solenoid H, there is no current through the excitation coil 1, except during a short period at the activation time. The plunger 2 is held in the retracted position against the force of the spring 17 by the magnetic flux passing through the permanent magnet 20, plunger 2, iron core 19, yoke 18, and permanent magnet 20. Consequently, the disk 3 is separated from the valve seat 4 to open the pilot valve G and the main valve F.

In order to close the main valve F, an excitation current in a pulse waveform is generated in the excitation coil 1 from the solenoid drive control unit I (described in detail hereinafter) to generate a magnetic flux for offsetting the magnetic flux of the permanent magnet 20. The generated magnetic flux momentarily reduces the magnetic flux through the plunger 2, by which the plunger 2, whose holding force is now lost, is pushed downward by the force of the spring 17 to close the pilot valve G. The plunger 2 is of course held in the downward protruding position by the force of the spring 17. The closing operation of the pilot valve G also closes the main valve F as explained hereinbefore.

FIG. 2 shows an example circuit of the solenoid drive control unit I, in which the numeral 1 denotes the excitation coil, the numerals 22 and 23 denote SCRs, the numerals 22a and 23a denote the SCR gates, the numeral 24 denotes the power source battery, the numeral 25 denotes a changeover switch, and the numeral 26 denotes a signal input terminal.

When a signal representing of "open valve" is input to the input terminal 26 from an intensive meter control unit B, etc., the contact 25a of the changeover switch 25, which is normally in the open position, is connected to the terminal 25b. When a signal representing of "close valve" is input to the input terminal 26, the contact 25a is connected to the contact 25c.

When the "open valve" signal is input to the input terminal 26 to connect the battery 24 across the terminals $S_1$ and Sc, firstly the capacitor $C_1$ starts to be electrically charged. When the terminal voltage across the capacitor $C_1$ is increased to a predetermined value with the electric charge and the input voltage to the gate 22a reaches a value for permitting operation, the SCR 22 conducts a discharge current from the capacitor $C_1$ through a part of the excitation coil 1 in the direction indicated by an arrow a. Consequently, the plunger 2 is attracted, to open the pilot valve G and the main valve F.

Conversely, when the "close valve" signal is input to the input terminal 26, the battery 24 is connected across the terminals $S_2$ and Sc to start charging the capacitor $C_2$. When the charging of the capacitor $C_2$ makes the input voltage of the gate 22b reach a predetermined value, the SCR 23 conducts a discharge current from the capacitor $C_2$ through a part of the excitation coil in the direction indicated by an arrow b. Consequently the pilot valve G and main valve F are closed.

The charging periods of the capacitors $C_1$ and $C_2$ are individually selected to be 30 to 120 seconds, while the conducting period of the SCRs 22 and 23 are individually selected to be 0.1 to 0.2 second. The contact 25a of the changeover switch 25 is set back to the open position by inhibiting the input signal to the input terminal 26 when the discharging operations of the capacitors $C_1$ and $C_2$ are completed.

The power source battery 24 takes the form of a solar battery or a lithium battery (1,300 mAH, 6 V). It has been assured that the above batteries can provide power for opening and closing the main valve F, where the former can operate semipermanently and the latter can operate for more than 4 years when used ten times a day.

The controlled valve system in accordance with the present invention adopts a way of charging the capacitor C in a certain period from the battery power source 24 and automatically supplying a pulse discharge current to the excitation coil 1 from the capacitor C after completion of the charging operation. Therefore, even a battery power source 24 having a comparatively small capacity can provide the impulse excitation current necessary for operating the solenoid. In comparison to a case in which a certain excitation current for activating the excitation coil 1 is directly supplied from the battery power source, the system of the present invention has the advantage of a reduced battery capacity. As a result, a compact battery can be used, which also leads to a reduction in the size of the controlled electromagnetic valve system.

As mentioned above, the controlled valve system in accordance with the present invention can provide superior effects in many applications.

What is claimed is:

1. A pilot type controlled electromagnetic valve system comprising:
    a main valve;
    a pilot valve for selectively controlling a fluid flow path extending from said main valve through said pilot valve to thereby control operation of said main valve, said pilot valve comprising:
        plunger means movable between a first position whereat it blocks said fluid flow path and a second position whereat it does not block said fluid flow path,
        spring means for biasing said plunger means toward said first position,
        a permanent magnet for generating a flux retaining said plunger means at said second position, and
        coil means for selectively generating magnetic fields to move said plunger means from one of said positions to the other; and,
    a drive control circuit for applying a first or a second excitation current pulse to said coil means,
    said coil means being responsive to said first excitation current pulse for moving said plunger means from said first to said second position against the bias of said spring means, and responsive to said second excitation current pulse for generating a flux offsetting said retaining flux of said permanent magnet whereby said plunger means is moved to said first position by said spring means;
    said drive control circuit comprising:
        first and second capacitors,
        a battery,
        switch means connected to said battery and said first and second capacitors, said switch means including means responsive to a first signal for connecting said battery to said first capacitor to charge said first capacitor and means responsive to a second signal for connecting said battery to said second capacitor to charge said second capacitor,
        first and second gating devices,
        said first gating device being connected to said first capacitor and said coil means for gating the charge on said first capacitor into said coil means as said first excitation current pulse,
        said second gating device being connected to said second capacitor and said coil means for gating the charge on said second capacitor into said coil means as said second excitation current pulse;
        said first gating device having a control electrode responsive to a voltage on said first capacitor for gating the charge on said first capacitor into said coil for a first interval of time, and,
        said second gating device having a control electrode responsive to a voltage on said second capacitor for gating the charge on said second capacitor into said coil means for a second interval of time.

2. An electromagnetic valve system as claimed in claim 1 wherein said first and second intervals of time are between 0.1 second and 0.2 second.

3. An electromagnetic valve system as claimed in claim 1 wherein said first and second gating devices are responsive to the voltages on said first and second capacitors, respectively, attained between 30 seconds and 120 second after said switch means connects said battery to said first capacitor, or said second capacitor.

4. An electromagnetic valve system as claimed in claim 1 wherein said first and second gating devices are first and second silicon controlled rectifiers.

5. An electromagnetic valve system as claimed in claim 1 wherein,
    said main valve comprises a main valve body having a valve seat, a diaphragm valve disk cooperating with said valve seat to selectively control fluid flow through said main valve from a primary fluid path to a secondary fluid path, and a bonnet mounted on said main valve body and cooperating with said diaphragm valve disk to form a bonnet chamber;
    said pilot valve having a pilot valve housing fixed to the main valve housing and having a pilot valve chamber therein, a pilot valve seat, and a pilot valve disk carried by said plunger means and cooperating with said pilot valve seat;
    said fluid flow path comprising a first fluid passage extending from said secondary fluid path to said pilot valve chamber through said pilot valve seat, and a second fluid passage connecting said pilot valve chamber and said bonnet chamber;
    and a further fluid path connecting said pilot valve chamber with said primary fluid path.

* * * * *